United States Patent [19]

Brodie et al.

[11] 3,924,824

[45] Dec. 9, 1975

[54] CROSS TRACK STRAPDOWN INERTIAL QUIDANCE SYSTEM

[75] Inventors: Peter M. Brodie, Oakland; Edwin G. Solov, Wayne, both of N.J.

[73] Assignee: The Singer Company, Little Falls, N.J.

[22] Filed: Oct. 17, 1973

[21] Appl. No.: 407,121

[52] U.S. Cl. ............................................. 244/3.2
[51] Int. Cl.[2] ..................... F42B 15/02; F41G 7/00
[58] Field of Search ........................... 244/3.15, 3.2

[56] References Cited
UNITED STATES PATENTS

| | | | |
|---|---|---|---|
| 3,231,726 | 1/1966 | Williamson | 244/3.2 |
| 3,272,972 | 9/1966 | Yamron et al. | 244/3.2 |
| 3,374,966 | 3/1968 | Howard | 244/3.2 |
| 3,412,239 | 11/1968 | Seliger et al. | 244/3.2 |

Primary Examiner—Stephen C. Bentley
Assistant Examiner—C. T. Jordan
Attorney, Agent, or Firm—T. W. Kennedy

[57] ABSTRACT

A simplified strapdown inertial guidance system is provided for the cross track or inertial "line-of-sight" planar guidance of an unmanned tactical vehicle, or the like; wherein one of the attitude angles can be of large magnitude. The system includes three orthogonally-mounted accelerometers and two gyroscopes. The large attitude angle is accommodated by torquing the appropriate gyroscope in a capture loop. The system implements the body attitude angles to inertial attitude angles in two steps. First a transformation is made from body to gyroscope coordinates, and then a transformation is made from gyroscope to inertial coordinates.

5 Claims, 3 Drawing Figures

CROSS TRACK STRAPDOWN INERTIAL QUIDANCE SYSTEM

BACKGROUND OF THE INVENTION

There are two basic types of inertial navigation systems known to the art. These are the gyroscopic-stabilized gimballed systems, and the "strapdown" non-gimballed systems. The gimballed system contains a stable platform on which a cluster of accelerometers is mounted to be stabilized thereby in a known orientation about three mutually perpendicular axes, and in which gyroscopes serve as error detectors to maintain the stabilization of the platform. The strapdown system, on the other hand, eliminates the stable platform completely, and the gyroscopes and accelerometers are mounted directly on the body of the vehicle on which the system is carried.

Although the prior art strapdown system does serve to eliminate the stable platform and its complex stabilization elements and circuitry, it usually requires a highly complex computer to convert its output signals into useful navigational information. That is, the conventional prior art strapdown navigational system operates by converting accelerometer measurements from body coordinates to inertial coordinates. This conversion is achieved by determining the attitude angles between the body-fixed and inertial-fixed coordinate frames. When the attitude signals are of any appreciable size, which is usually the case, the computations and implementations between the coordinate frames become most complex.

The present invention is concerned with the implementation of the low cost strapdown inertial guidance system for the special case of cross track or line-of-sight planar guidance of unmanned tactical vehicles, without becoming involved in the usual complex prior art systems for computing the attitude angles. Specifically, when the vehicle attitude can be kept within a small angle of a single plane, the system of the invention is operative to provide a simple means for processing three-axis attitude and three-axis accelerometer measurements.

Specifically, the invention provides a simple and inexpensive inertial guidance system for use on an unmanned tactical vehicle maneuvering in one plane for cross track or inertial line-of-sight planar guidance of the vehicle, and wherein one of the attitude signals can be of a large magnitude. The system of the invention is of the strapdown type, and it utilizes simple and inexpensive gyroscopes requiring only fixed, or "bangbang" torquing provisions. The aforesaid large attitude angle is accommodated by torquing the appropriate gyroscope in a "capture" loop, as will be described.

DETAILED DESCRIPTION OF THE ILLUSTRATED EMBODIMENT

Figure 1:
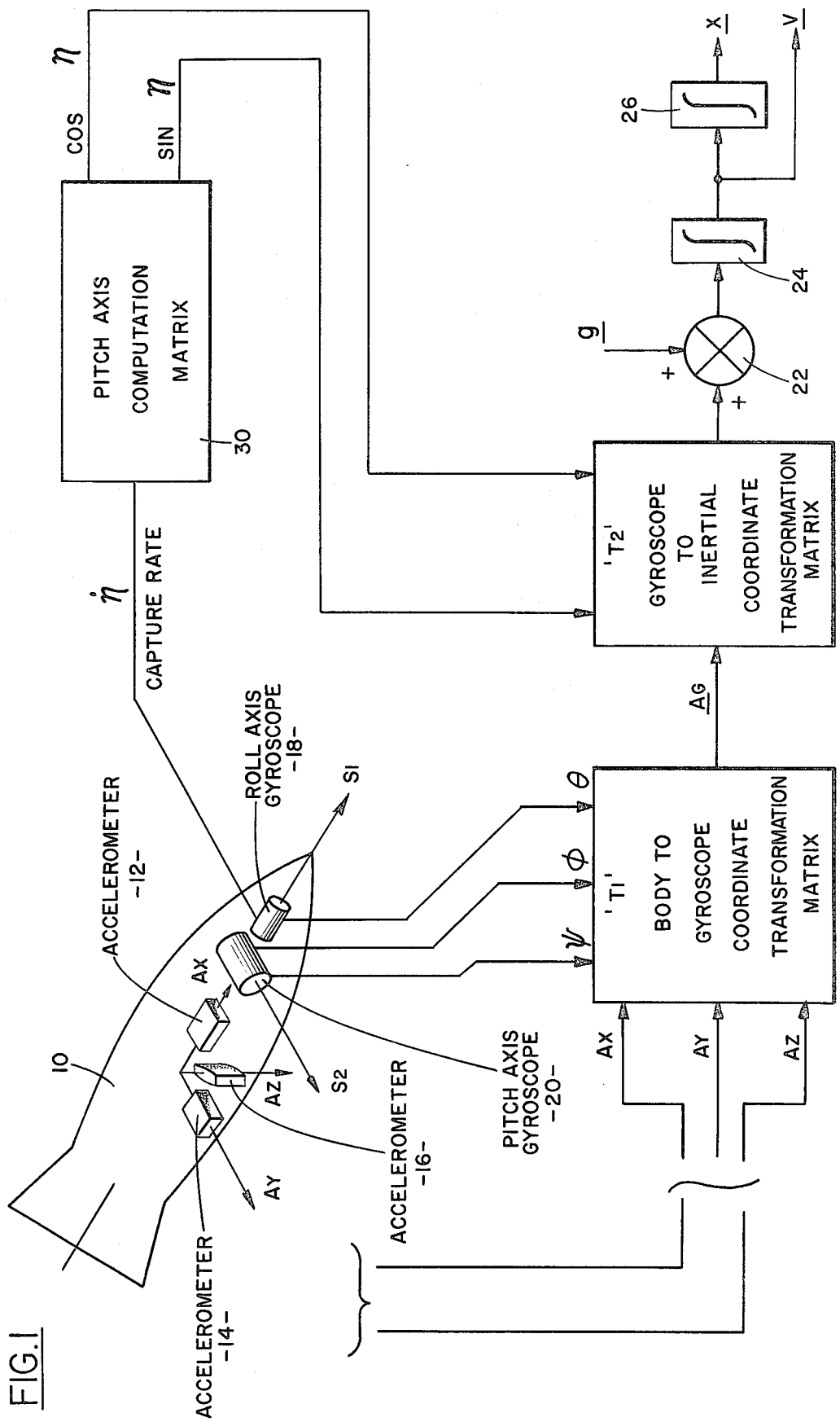
FIG. 1 is a schematic and block diagram representing the system of the invention in one of its embodiments.

As shown in FIG. 1, a vehicle shown schematically as 10 may, for example, be an unmanned tactical vehicle whose attitudes are within a small angle of a single plane. The low cost inertial guidance system of the invention is useful for cross track or line-of-sight planar guidance of the vehicle.

The system includes three orthogonally-mounted accelerometers 12, 14 and 16 directly mounted on the body of the vehicle. The accelerometer 12 provides signals representative of accelerations along the heading axis of the vehicle ($A_X$); the accelerometer 14 provides signals representative of accelerations along the cross-heading axis of the vehicle ($A_Y$); and the accelerometer 16 provides signals representative of accelerations along the Z-axis of the vehicle ($A_Z$).

Two gyroscopes, designated the roll axis gyroscope 18 and the pitch axis gyroscope 20, are also mounted on the vehicle. The roll axis gyroscope 18 has a spin vector $S_1$, as shown, thereby supplying a measure of pitch angle $\theta$ and capture rate $\eta$. This gyroscope is captured loosely about null. The pitch axis gyroscope 20 has a spin vector $S_2$ and is not captured. The pitch axis gyroscope supplies direct measures of the yaw angle $\Psi$ and the roll angle $\phi$.

The gyroscopic outputs $\Psi$, $\phi$ and $\theta$ are applied to a body-to-gyroscope coordinate transformation matrix $T_1$, as shown, and the acceleration signals $A_X$, $A_Y$ and $A_Z$ are also applied to the matrix. The outputs from the matrix $T_1$ designated $A_g$ are applied to a gyroscope-to-inertial coordinate transformation matrix $T_2$. The output of the matrix $T_2$ is introduced to a summing network 22, and a gravity term $g$ is also applied to the summing network. The output of the summing network 22 is applied to a first integrator 24, whose output is applied to a second integrator 26. The inertial term X is derived from the integrator 26, and the term V is derived from the integrator 24. The capture rate output $\eta$ from the gyroscope 18 is applied to a pitch axis computation matrix 30 which produces $\cos \eta$ and $\sin \eta$ terms, which are applied to the matrix $T_2$.

Figure 2:
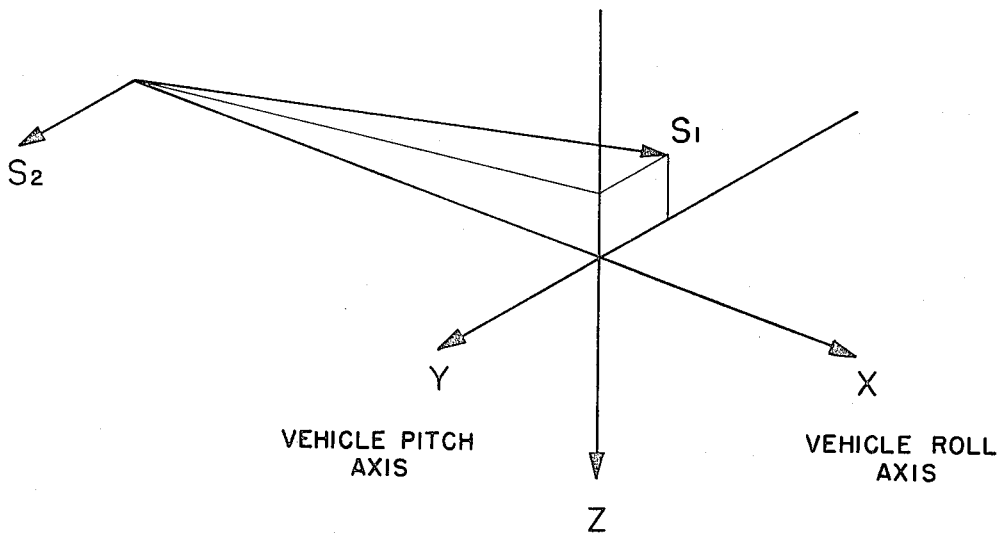
FIG. 2 is a vector diagram representing the vectors of the gyroscopes in the system to be described.

As illustrated in FIG. 1, the transformation between body and inertial coordinates is implemented in two steps. The first step occurs in the matrix $T_1$ which represents a transformation from body-to-gyroscope coordinates, and the second transformation occurs in the matrix $T_2$ which represents a transformation from gyroscope-to-inertial coordinates. The first transformation in the matrix $T_1$ from body-to-gyroscope coordinates is derived as follows:

The spin vectors of the roll and pitch gyroscopes are denoted by the unit vectors $S_1$ and $S_2$ respectively. The gyroscope coordinate frame contains both these vectors. This frame is also a rotating or moving coordinate frame as the roll gyroscope is bang-bang torqued about its null. The components of the respective spin vector can be given in the pick-off plane as shown in FIG. 2, and the vectors can be expressed as follows:

$$\begin{bmatrix} S_{1X} \\ S_{1Y} \\ S_{1Z} \end{bmatrix} = \begin{bmatrix} X \cdot S_1 \\ Y \cdot S_1 \\ Z \cdot S_1 \end{bmatrix} \quad (1)$$

These spin vector components are actually the quantities which the two axis gyroscope measures. That is, $S_{1Y}$, $S_{1Z}$ are pick-off outputs. $S_{1X}$ is close to 1 and can be calculated from:

$$|S_1| = \sqrt{S_{1X}^2 + S_{1Y}^2 + S_{1Z}^2} = 1 \quad (2)$$

Similarly for the second two-axis gyroscope (roll gyroscope):

$$\begin{bmatrix} S_{2X} \\ S_{2Y} \\ S_{2Z} \end{bmatrix} = \begin{bmatrix} X \cdot S_2 \\ Y \cdot S_2 \\ Z \cdot S_2 \end{bmatrix} \quad (3)$$

A third orthogonal vector $S$ must now be formed as:

$$\begin{aligned} S_1 &= (1, 0, 0) \\ S_2 &= (0, 1, 0) \\ S_Z &= (0, 0, 1) \end{aligned} \quad (4)$$

Where:

$$S_Z = (S_{1_B} \times S_{2_B}) \quad (5)$$

There is a transformation "$T_1$" between body and gyroscope coordinates frames. In terms of the gyroscope spin vectors:

$$[T_1]^{-1} [I]_G = [S_{1_B}, S_{2_B}, (S_{1_B} \times S_{2_B})]_{Body} \quad (6)$$

Where I is the identity matrix $$\begin{bmatrix} 1 & 0 & 0 \\ 0 & 1 & 0 \\ 0 & 0 & 1 \end{bmatrix} \quad (7)$$

As $T_1$ is an orthogonal matrix $$T_1 = \begin{bmatrix} S_{1BX} & S_{1BY} & S_{1BZ} \\ S_{2BX} & S_{2BY} & S_{2BZ} \\ S_{3BX} & S_{3BY} & S_{3BZ} \end{bmatrix} \quad (8)$$

Where all terms are the direct outputs from the gyroscope pickoffs, that is, no trigonometric functions are required.

A second transformation matrix '$T_2$' from the moving gyroscope frame to an inertial frame is now derived so that the body-to-inertial transformation matrix "$T_{BI}$" can be expressed as $$T_{BI} = T_2 T_1 \quad (9)$$

This second or "gyroscope" frame to inertial frame transformation can be written simply as:

$$T_2 = \begin{bmatrix} \cos\eta & 0 & -\sin\eta \\ 0 & 1 & 0 \\ \sin\eta & 0 & \cos\eta \end{bmatrix} \quad (10)$$

where $\eta$ is the "pitch" angle corresponding to the motion of the gyroscope frame and representative of the area under the gyroscope torquing curve.

An important feature of this approach is that the time variation of this matrix (usually calculated as $T = T\omega$) reduces simply to the above where:

$\eta = \dot{\eta}t + \eta(0)$
$\dot{\eta}$ = gyroscope torquing rate
$t$ = elapsed torquing time.
$\eta(0)$ = the initial value of the angle $\eta$.

Figure 3:
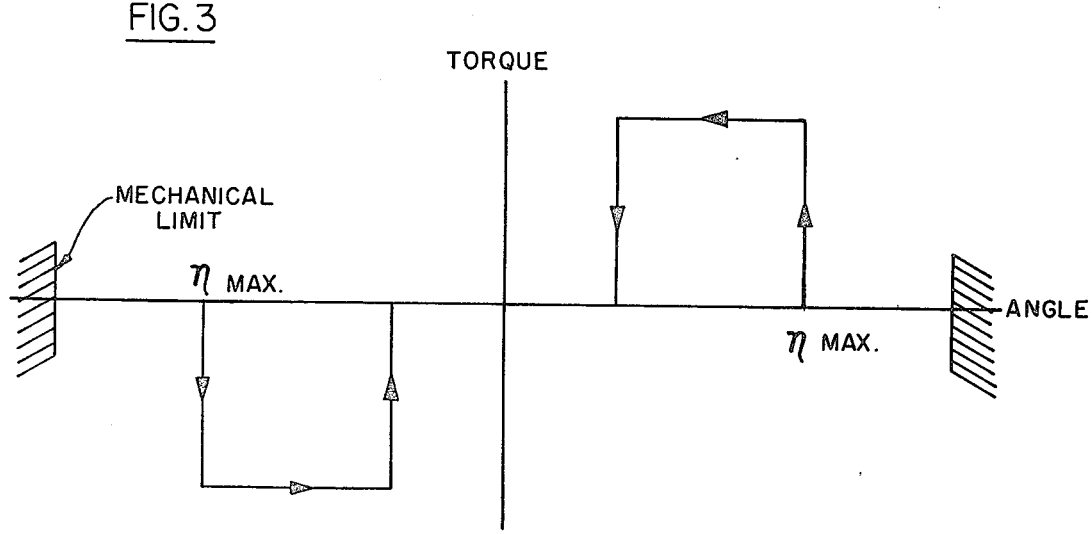
FIG. 3 is a waveform illustrating the bang-bang torquing of one of the gyroscopes.

This simplification is a direct consequence of the unique constant level gyro torquing technique. This gyroscope torquing is accomplished in a bang-bang fashion using a "hysteresis" circuit thereby avoiding any problems of torquer linearity. FIG. 3 shows this torquing curve.

It should be noted that even though the roll axis gyroscope 18 is not closely captured, no errors are introduced by it into the system because the pick-offs always measure true body position with respect to the gyroscope coordinate frame, that is, the matrix $T_1$. In addition to the above pitch axis torquing, it is also necessary to avoid torquing the yaw axis at the same time in the same gyroscope. Corrective torquing is then desirable to maintain orthogonality between the pitch and yaw axes.

It is conceivable during a maneuver, that vehicle roll could cause a non-orthogonality condition to develop during gyroscope torquing. Once this occurs, the sensed pitch rate would be in error. This condition can be avoided by torquing the yaw axis to maintain orthogonality. Orthogonality can be measured by forming the following dot product equality:

$$S_Y \cdot S_X = 0$$

where:

$S_X$ and $S_Y$ are the body components of the inertial spin vector.

The system provides, therefore, a simplified means for the transformation of the measured accelerations $A_X$, $A_Y$ and $A_Z$ to inertial or guidance plane coordinates, at which point they may be integrated and used for vehicle guidance purposes. The most important feature of the system is its simplification as compared with conventional strapdown inertial guidance systems.

As described above, the simplification in the strapdown system of the invention is achieved by the use of an attitude gyroscope with a pitch axis oriented spin vector which permits a simplified transformation to gyroscope coordinates, and by the loose bang-bang torquing of the roll axis gyroscope which eliminates the problems of torquer linearity.

As also described, the system implementation involves two transformation steps: a first from a body coordinate frame to a gyroscope coordinate frame which rotates with the torquing of the roll axis gyroscope; and a second from the moving gyroscope frame to an inertial coordinate frame which is a function of the roll axis gyroscope torquing rate.

While a particular embodiment of the invention has been shown and described, modifications may be made, and it is intended in the following claims to cover the embodiments which fall within the true spirit and scope of the invention.

What is claimed is:

1. A strapdown inertial guidance system for a vehicle, comprising:

a first accelerometer mounted in said vehicle for producing an output signal ($A_X$) representing the acceleration of said vehicle along a heading axis;

a second accelerometer mounted in said vehicle for producing an output signal ($A_y$) representing the acceleration of said vehicle along a cross-heading axis perpendicular to said heading axis;

a third accelerometer mounted in said vehicle for producing an output signal ($A_Z$) representing the acceleration of said vehicle along a Z-axis perpendicular to said heading and cross-heading axes;

roll axis gyroscope means captured loosely about null mounted on said vehicle to produce output signals representing the pitch angle ($\theta$) and the rate of angular rotation ($\eta$) about the roll axis of the vehicle; and pitch axis gyroscope means mounted on said vehicle to produce output signals representative of the yaw angle ($\Psi$) and of the roll angle ($\phi$) of the vehicle.

2. The inertial guidance system defined in claim 1, and which includes a first transformation matrix coupled to said gyroscopes and to said accelerometers, and responsive to the output signals therefrom representative of the roll, yaw and pitch angles, to transform the coordinate frame of said accelerometer signals from a body coordinate frame to an inertial coordinate frame.

3. The inertial guidance system defined in claim 2, and which includes a second transformation matrix coupled to said first transformation matrix to transform the accelerometer signals from said first matrix from a moving gyroscope coordinate frame to an inertial coordinate frame.

4. The inertial guidance system defined in claim 3, and which includes computation means coupled to said roll axis gyroscope and responsive to the output signal therefrom representing the rate of angular rotation about the pitch axis, signals representative of the sin and cosine of the pitch angle and for introducing such signals to said second transformation matrix.

5. The inertial guidance system defined in claim 1, in which said roll axis gyroscope means is captured by bang-bang torquing about its null utilizing a hysteresis circuit.

* * * * *